US007000663B2

(12) United States Patent
Barody

(10) Patent No.: US 7,000,663 B2
(45) Date of Patent: Feb. 21, 2006

(54) SHAPING DRUM FOR THE MANUFACTURE OF TIRES

(75) Inventor: Didier Barody, Le-Cendre (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 184 days.

(21) Appl. No.: 10/620,473

(22) Filed: Jul. 15, 2003

(65) Prior Publication Data

US 2004/0050499 A1 Mar. 18, 2004

Related U.S. Application Data

(63) Continuation of application No. PCT/EP02/00281, filed on Jan. 14, 2002.

(30) Foreign Application Priority Data

Jan. 15, 2001 (FR) .................................... 01 00776

(51) Int. Cl.
B29D 30/24 (2006.01)
(52) U.S. Cl. ................. 156/415; 156/417; 156/420
(58) Field of Classification Search ............... 156/414, 156/415, 417–420, 398
See application file for complete search history.

(56) References Cited

U.S. PATENT DOCUMENTS

| 2,603,581 A | | 7/1952 | Ericson et al. ................. 154/9 |
| 3,038,526 A | * | 6/1962 | Wilhelm ..................... 156/420 |
| 3,366,526 A | | 1/1968 | Winslow ..................... 156/420 |
| 4,126,507 A | * | 11/1978 | Kim et al. ................... 156/415 |
| 4,510,012 A | | 4/1985 | Kawaida et al. ............ 156/415 |
| 5,164,035 A | | 11/1992 | Nakajima et al. ........... 156/415 |
| 5,460,685 A | | 10/1995 | Siegenthaler ............... 156/420 |

FOREIGN PATENT DOCUMENTS

| DE | 2300330 | 7/1974 |
| EP | 0661150 | 7/1995 |
| FR | 830916 | 8/1938 |

* cited by examiner

*Primary Examiner*—Geoffrey L. Knable
(74) *Attorney, Agent, or Firm*—Buchanan Ingersoll PC

(57) ABSTRACT

A shaping drum for tire carcasses includes a barrel (5), comprising two systems for holding the beads (7, 8) of a carcass (2) to be shaped carried by the barrel, and a receiving surface (30) for the tire carcass which is formed by the outer surfaces (310) of a plurality plates (31) which are mounted on the barrel (5) and arranged circumferentially around the central axis of the barrel (5). The plates (31) are radially displaceable between a retracted position and an expanded position of the drum (1). Guide structure (43) on the inner side of each plate (31) bears on an adjacent plate, permitting the positioning of each plate at the same radial level in the expanded position of the drum and permitting the tilting of each plate about an axis parallel to the central axis such that the plates are circumferentially superimposed in the retracted position of the drum (1).

10 Claims, 4 Drawing Sheets

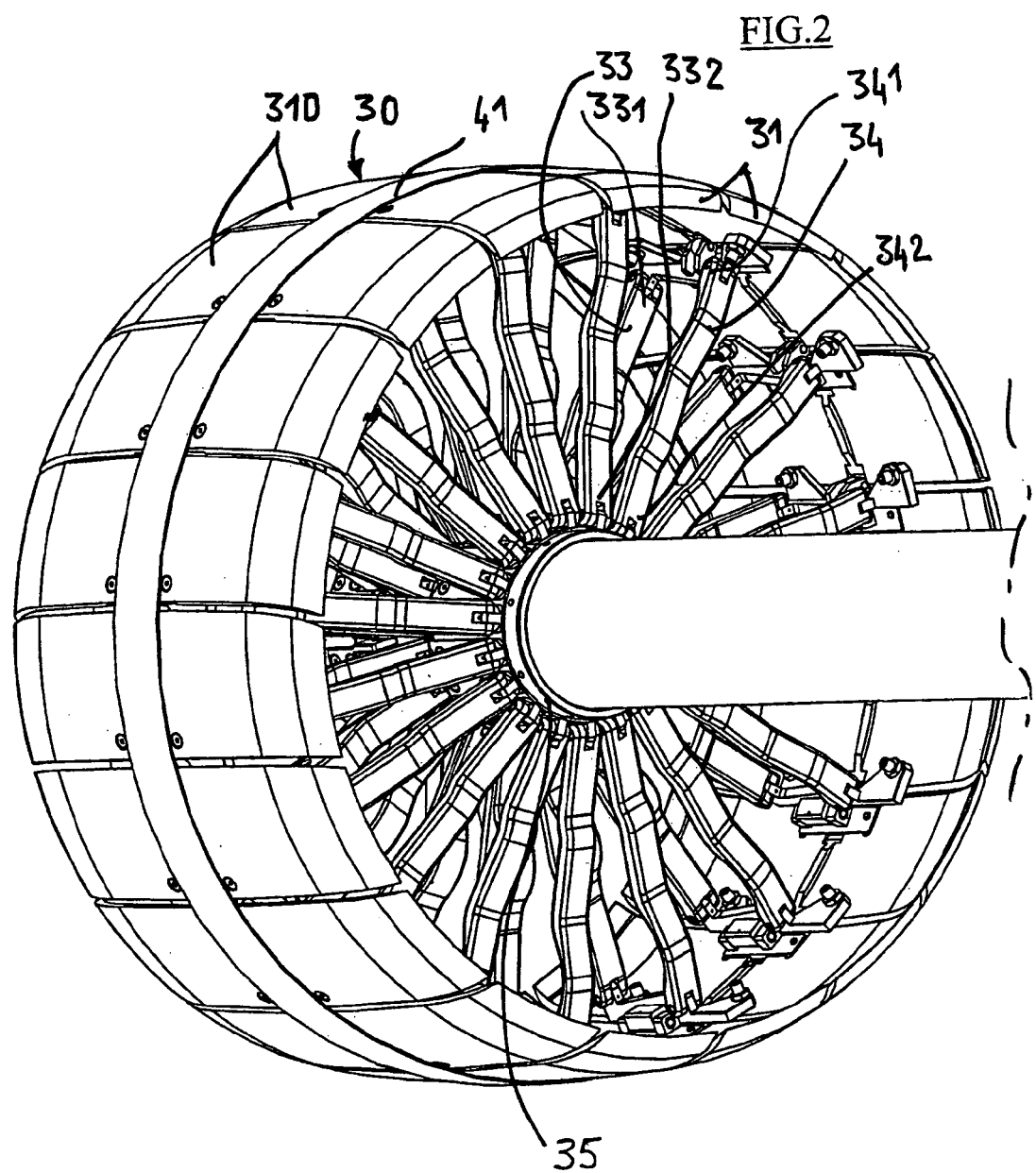

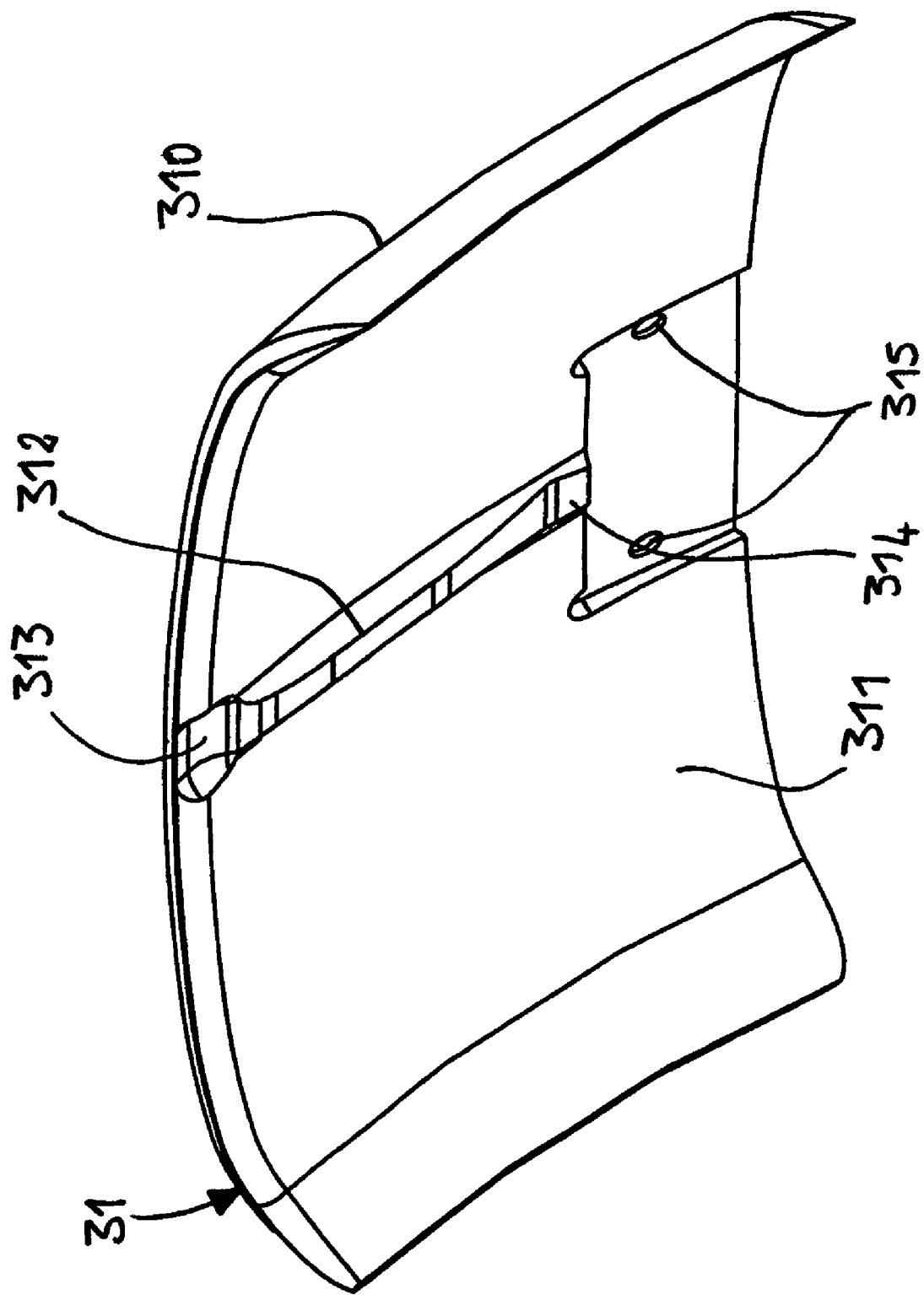

SHAPING DRUM FOR THE MANUFACTURE OF TIRES

CROSS REFERENCE TO RELATED APPLICATIONS

This is a continuation of international application PCT/EP02/00281 filed Jan. 14, 2002, which was published in French on Jul. 18, 2002 as international publication WO 02/055290 and which claims priority of French application 01/00776 filed Jan. 15, 2001.

BACKGROUND OF THE INVENTION

1. The Field of Invention

The invention relates to a shaping drum for tire carcasses. The shaping of the carcass is a step in the manufacture of tires which consists of bringing together the recesses for receiving the beads of the tire on the drum and effecting the radial expansion of all or part of the carcass laid on the drum.

2. The Related Art

Different types of so-called "membrane-free" shaping drums exist. There are mainly two major categories: drums in which the shaping of the carcass is obtained by the pressure of a fluid directly in contact with the walls of the carcass, and drums using mechanical devices for actuating plates or other elements (which will be referred to generically by the word "plate") constituting the receiving surface for the carcass.

What is of interest here is the manufacture of tires where the carcass is initially virtually cylindrical and has to be shaped so as to be greatly domed, the tire beads of the carcasses being axially relatively close, as is the case for certain heavy-vehicle tires, competition tires or aeroplane tires. It is easy to understand that for reasons of weight and stability during manufacture it is necessary to use the category of drums which utilize mechanical devices. However, the difficulty results, on one hand, from the very great difference in diameter between the carcass before and after shaping (which may be as much as 200%), and, on the other hand, from the very small diameter of the carcass to be shaped (such as tires intended to be mounted on rims of a diameter of 13 inches), which presupposes that the plates and their actuating mechanism occupy as little space as possible in the retracted position of the drum, but nevertheless are capable of opening out radially to a considerable extent.

Solutions have been proposed, such as that set forth in publication JP-49-13629, which describes a drum utilizing, for shaping the carcass, "plates" which are slightly domed and mounted respectively on crossed connecting rods. Although it seems reliable, such a drum cannot accept any major difference between the diameter of the receiving surface of the drum in the retracted position and the diameter of the receiving surface of the drum in the expanded position. Furthermore, the minimum diameter of the drum is not able to accept tires intended to be mounted on rims of a diameter of 13 inches, for example. In fact, the crossed connecting rods still take up a lot of space in the retracted position of the drum.

Other drums of this category solve this problem by making the plates and their expansion mechanisms take up less space in the retracted position of the drums, such as that described in publication FR-830 916, which has plates forming the receiving surface for the drum and which are actuated respectively by a gear mechanism. This gear mechanism comprises, for each plate, two pinions which cooperate with each other and which are each borne by the end of an arm comprising three parts with distinct radii of curvature, the other end of the arm being axially mobile on the body of the drum. Such a drum, owing to the complexity of the gear mechanism, cannot accept tires having different diameters of the carcass before shaping even within a narrow range.

Although distinct, but because of their overall bulk, the same observations may be applied to the expansion mechanisms as proposed in publication DE 2 300 330 and U.S. Pat. No. 3,366,526.

The invention aims to overcome all these disadvantages.

Hereafter, "axial, radial, and circumferential direction" will be understood to mean the directions parallel to the axial, radial and circumferential directions, respectively, relative to the drum axis.

SUMMARY OF THE INVENTION

According to the invention, a shaping drum for tire carcasses, which is mounted on a barrel, comprises two systems for holding the bead of a carcass to be shaped which are mounted on the barrel, a receiving surface for the carcass which is formed by the outer surfaces of plates arranged circumferentially around the barrel, and mechanical expansion means connected to the barrel and to a clevis attached to each plate for allowing a radial displacement of the plates between a retracted position and an expanded position of the drum, wherein the plates are connected to the devises by means of articulations located on the inner surfaces of the plates, which articulations allows the plates to pivot around axes parallel to the axis of the drum, and are equipped with guide means by means of which each plate bears, along its inner surface, on the guide means of an adjacent plate so as to permit the positioning of the outer surface of each plate at the same radial level in the expanded position of the drum and to permit tilting about the respective articulations such that the plates are circumferentially superposed on each other at least in part in the retracted position of the drum.

BRIEF DESCRIPTION OF THE DRAWINGS

Other characteristics and advantages of the invention will become apparent from the following description of an exemplary embodiment of a drum according to the invention with reference to the appended drawings, in which:

FIG. 2 is a partial perspective view of the embodiment of the drum shown in FIG. 1B in its expanded position looking in the direction of the arrow F;

FIG. 5 is a perspective view of a plate shown in FIG. 2.

DETAILED DESCRIPTION OF AN EXEMPLARY EMBODIMENT

Figures 1A, 1B:
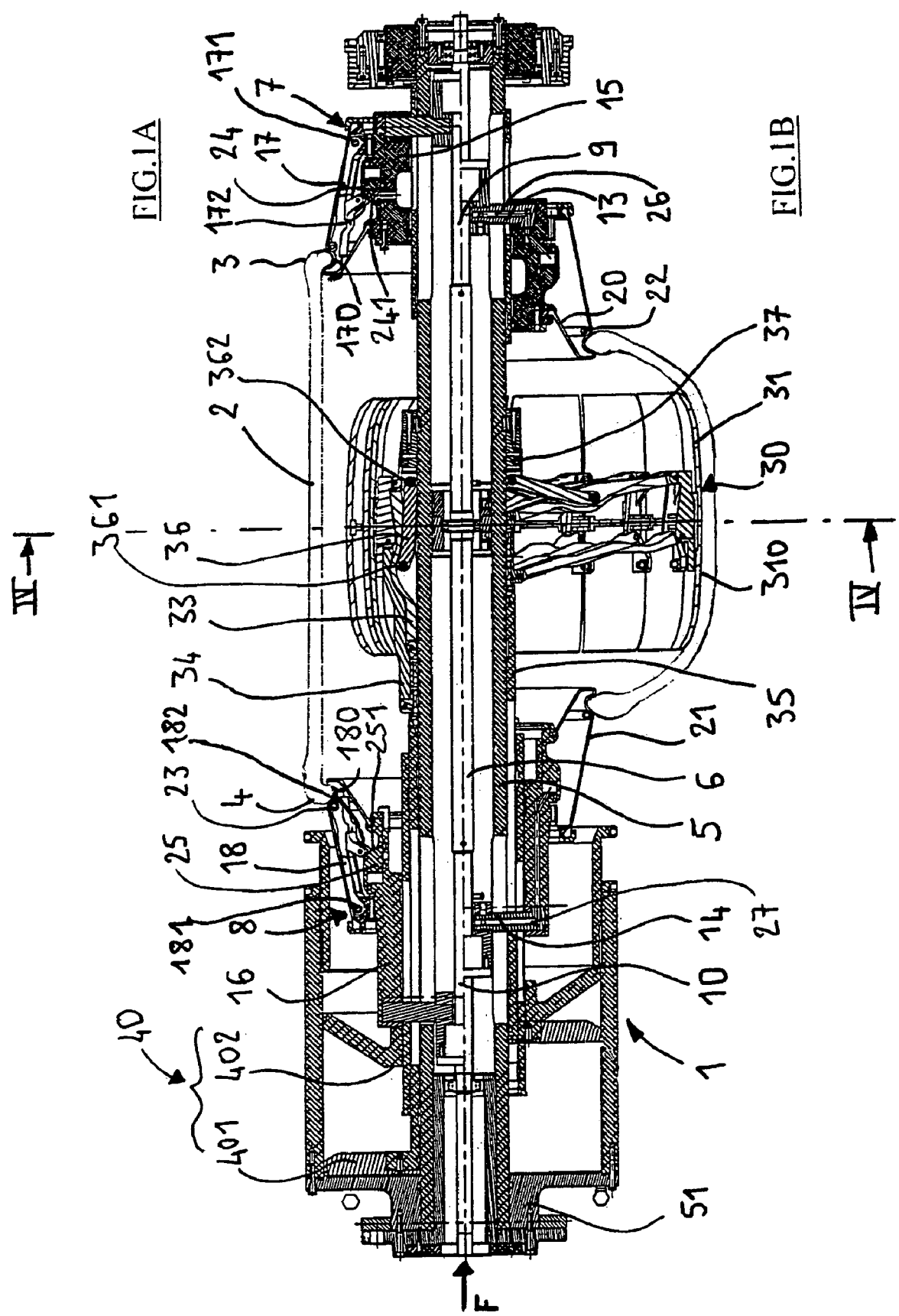
FIGS. 1A and 1B are diagrams in axial half-section of an embodiment of a drum according to the invention in the retracted position of the drum and in the expanded position of the drum, respectively.

In FIGS. 1A and 1B, an embodiment of the drum 1 comprises a barrel 5 within which there is mounted a central rotary screw 6. One end 51 of the barrel 5 permits mounting of the drum on an assembly machine, as is known in the art.

The drum 1 also comprises a receiving surface for the tire carcass to be shaped, which will be explained in greater detail hereinafter.

A tire carcass 2 with two beads 3 and 4 is shown in FIG. 1A very diagrammatically positioned above the drum 1 before being taken up by the drum and shaped, as illustrated in FIG. 1B. In order to do this, the barrel 5 has two axially-spaced bead holding systems 7, 8, the relative axial movement of which is controlled by means of the central screw 6.

The central screw 6 comprises threaded zones with two inverted pitches 9 and 10 which actuate the bead holding systems 7, 8 by means of fingers 13, 14, each of which entrains a support 15, 16 forming part of the respective bead holding systems.

Each of the bead holding systems 7, 8 effectively comprises, in addition to the support 15, 16, a plurality of rigid segments 17, 18 distributed regularly about the barrel 5 and extending substantially in the axial direction and an elastic membrane 20, 21 which envelopes the segments. Each membrane 20, 21 is fixed at its two ends to the respective supports 15, 16.

Each rigid segment 17, 18 comprises a recess 170, 180 for receiving a bead 3, 4 of the carcass 2 at its end which is arranged axially towards the inside of the drum 1. A circumferential spring 22, 23 is arranged in a groove at the rear of the recess 170, 180 of all segments 17, 18 beneath the membrane 20, 21, so as to block the rear of the bead 3, 4 and to cause the segments 17, 18, and hence the drum 1, to be returned to the retracted position. The presence of the membrane 20, 21 makes it possible to facilitate rotation of the beads 3, 4 of the carcass during shaping.

The segments 17, 18 can tilt radially about articulations 171, 181 at their ends that are arranged axially towards the outside of the drum 1 in order to come into contact with the beads 3, 4 of the carcass and to effect the holding thereof.

A slide 24, 25 is mounted to be axially movable relative to each segment 17, 18 and each support 15, 16. Each slide 24, 25 comprises a face forming a cam 241, 251 which is inclined relative to the axis of the drum, defining a conical surface so as to form a ramp which cooperates with a roller 172, 182 borne by one face of the segment 17, 18, which face is oriented internally relative to the center of the drum 1. The displacement of the slides 24, 25 is controlled pneumatically by the feed channel 26, 27 visible in FIGS. 1A and 1B, with the return to position being ensured by the springs 22, 23.

These arrangements of bead holding systems effectively make it possible not only to grip the beads of a tire carcass, but also to effect the axial bringing-together of the holding systems relative to each other and hence of the recesses for receiving the beads relative to each other, which operation is necessary to effect symmetrical shaping of the carcass. The bead holding systems described here are only described by way of examples, it being clear that other solutions may be used to produce the bead holding systems, provided that they satisfy the above functionalities.

The receiving surface 30 for the carcass 2 is formed by all of the outer surfaces 310 of plates 31 which are mounted and arranged circumferentially around the barrel 5. These plates 31 are displaceable radially by means of mechanical expansion means 33, 34, 36, as is described more fully hereinafter.

Thus, each plate 31 is fixed to a clevis 32 (FIG. 4) on which are mounted the respective ends 331, 341 of two arms 33, 34, the other two ends 332, 342 of which are mounted on a crown 35 (FIG. 1) mounted to be moveable axially along the barrel 5. On the arm 33 there is articulated the end 361 of a counter arm 36, the other end 362 of which is articulated on a crown 37 axially fixed relative to the barrel 5 (FIG. 1).

The actuation in axial displacement of the crown 35 makes it possible to effect tilting of the arms 33 and 34 due to the locking generated by the counter arm 36, and thus to change the radial position of the plates 31, the center of each plate 31 being displaced in a plane perpendicular to the axis of the drum. This axial displacement is controlled by a piston-cylinder unit 40 mounted on the barrel 5, the piston 401 of which has an axial extension on which the mobile crown 35 is fixed so as to be integral with the piston. A stop wall 402 of the piston 401, the axial position of which is adjustable, defines the maximum travel path of the crown 35 towards the crown 37, which corresponds to the expanded position of the drum 1 shown in FIG. 1B.

Each plate 31 has an outer surface 310 which is machined in a parallelepipedal volume, the profile of which is selected to be identical to the profile of laying of the products on the carcass 2; in particular, shoulders may be provided. Whatever this profile may be, the greatest length of each plate extends in the axial direction.

As shown more specifically in FIG. 2, all the plates 31 are covered by a circumferentially extending elastic sleeve 41 which ensures continuity between the plates in the expanded position of the drum 1 and contributes to guaranteeing the positioning of the plates relative to each other, as will be explained in greater detail hereafter, in the expanded position of the drum 1.

In addition to the expansion means, the drum 1 has guide means 32, 43, 312 for the plates 31 in their radial "upward movement" towards the outside of the drum and in their radial "downward movement" towards the center of the drum. In fact, it is essential for the reliability and the longevity of the drum 1, and more particularly of the plates 31 and their displacement mechanism, for the plates 31 which are superposed in the retracted position of the drum to be so in an ordered, controlled fashion to avoid impacts between them which could cause premature wear and major surface defects on the plates, and also so as to prevent friction between the plates which, by creating new stresses, could degrade the mechanical expansion system (plate-arm-crown synchronism) and could modify the profile of the plates 31.

Figure 4:
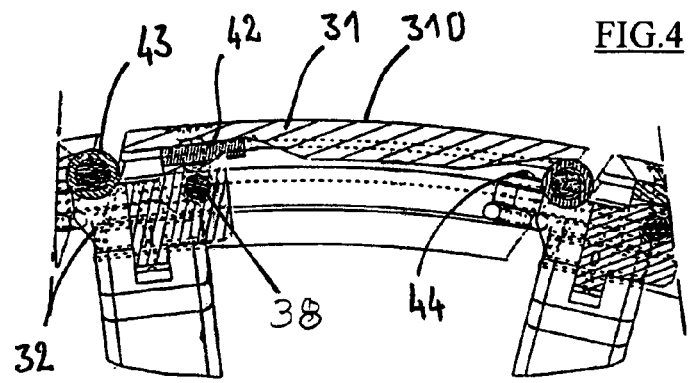
FIG. 4 is a partial sectional view of several plates taken along the line IV—IV in FIG. 1B.

This is why the arms 33, 34 are mounted on each plate 31 by means of the clevis 32 on which the arm ends 331, 341 are articulated, and which is itself fixed by means of a second clevis 42 integral with each plate 31 (FIG. 4). The second clevis 42 is articulated relative to the first clevis 32, the axis of the articulation 38 being parallel to the axis of the drum 1 such that the plate 31 can pivot relative to the arms 33 and 34.

Figure 3:
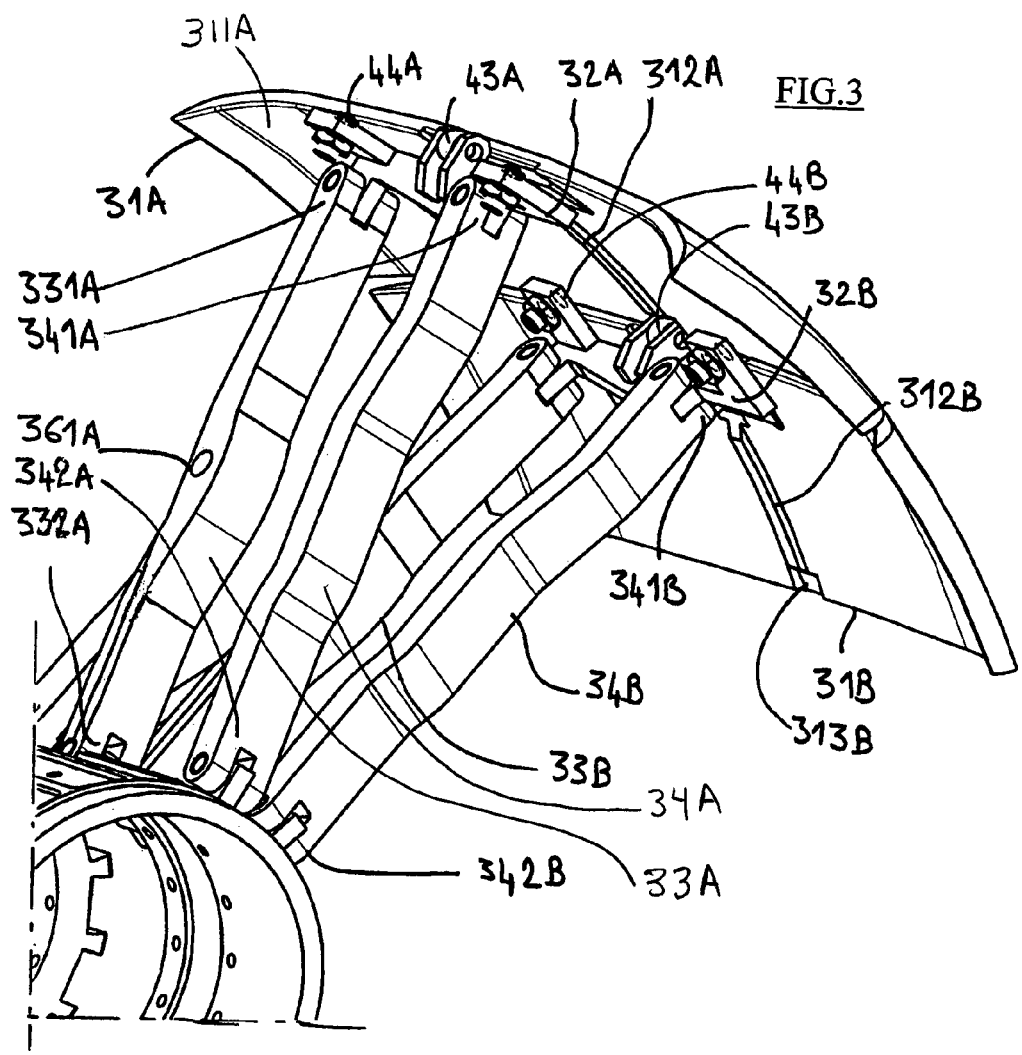
FIG. 3 is an enlarged detail view of several plates shown in FIG. 2.

Each clevis 32 associated with a plate 31 bears a guide device for the adjacent plate. To this end, each clevis 32 is mounted close to one of the lateral edges of each plate 31 which is parallel to the axis of the drum 1, such that each clevis 32 is arranged close to the adjacent plate 31. As shown in FIGS. 3 and 4, each clevis 32 bears a guide roller 43 which is arranged circumferentially on the outside of the plate 31 associated with that clevis.

Each plate 31 bears on its inner surface 311 relative to the center of the drum 1 a circumferentially extending cam 312 which is intended to cooperate with the roller 43 borne by the clevis fixed to the adjacent plate 31. The cam 312 opens respectively at the opposite two ends of the plate onto a recess 313, 314, respectively, for receiving the roller of the adjacent plate in order to optimize the two stop positions corresponding to the retracted position and to the expanded position of the drum 1.

The retracted position of the drum 1 corresponds to the radial position of the plates 31 which is closest to the center of the drum and are circumferentially superimposed on each other. The expanded position of the drum corresponds to the radial position of the plates 31 in which the outer surfaces 310 thereof form a cylindrical surface and are radially distanced from the center of the drum.

Advantageously, provision may be made for an adjustment means which makes it possible to affect the play between the plates 31 in order to obtain with one and the same set of plates different expanded diameters of the order of several millimeters. Thus, by acting on the circumferential length of the recess 313, a reduced range of the contact position of the roller 43 is created which corresponds to a reduced range of expanded diameter, the determination of the desired diameter being effected by the axial fixing of the stop wall 402 of the piston-cylinder unit 40.

Furthermore, each plate 31 bears contact screws 44 that are arranged axially on either side of the roller 43 and that are substantially aligned circumferentially with the roller in order to create additional supports between the plates 31 in the sole limit position corresponding to the expanded position of the drum 1. For reasons of symmetry and stability, the presence of two contact screws 44 for each plate 31 seems satisfactory.

FIG. 5 also shows on the inner surface 311 of a plate 31 through holes 315 for fixing screws for the clevis 42.

The operation of the guide device will be better understood with reference to FIG. 3, in which the suffixes A and B attached to the reference numbers of the different elements will be used to correspond to two adjacent plates 31A and 31B.

In FIG. 3, the drum is in the expanded position and, therefore, the plates 31A and 31B are in their position farthest from the center of the drum and the mobile crown 35 is in its position closest to the fixed crown 37.

In this position, the plates 31A and 31B are side by side without being in contact, but the roller 43B borne by the clevis 32B linked to the plate 31B is in contact with the plate 31A and, more precisely, bears on the recess 313 of the plate 31A (not observable in FIG. 3) located at one of the ends of the cam 312A, the pins 44B being in contact with the surface 311A. The contact between the plate 31A and the roller 43B is maintained due to the elastic sleeve 41 which is shown in FIG. 2.

In order to permit the drum 1 to move from its expanded position towards its retracted position, the piston-cylinder unit 40 is actuated with the displacement of the piston axially towards the outside of the drum 1, thereby causing the axial displacement of the crown 35 by moving it away from the fixed crown 37. The arms 33 and 34 actuating the plates 31 then tilt due to the locking generated by the counter-arms 36, resulting in the radial displacement of the plates towards the center of the drum.

During this movement together towards the center of the drum, the plates 31 remain in contact with each other owing to the guide roller 43 and to the force of the elastic sleeve 41 which maintains the roller/plate contact. Thus, the plates 31A and 31B are entrained by their respective arms 33A, 34A and 33B, 34B radially towards the center of the drum, the roller 43B then following the cam 312A, which drives the plate 31B to slide circumferentially beneath the plate 31A with a minimum play between the inner surface 311A and the outer surface 310 of the plate 31B.

Such positioning upon the radial movement of the plates 31 is possible due to the degree of freedom of pivoting of the plates relative to the devises 32 around the articulation axes 38. This arrangement effectively makes it possible to accept a very wide range of profiles for the plates, in particular profiles with shoulders.

When the roller 43B arrives at the end of the path of the cam 312A, it comes into contact with the recess 314 of the plate 31A (not observable in FIG. 3), which determines the second limit position of the plates 31 corresponding to the optimized retracted position of the drum. In this retracted position, the plates 31 largely cover one another in the circumferential direction.

The reverse movement from the retracted position of the drum to its expanded position can be deduced without difficulty from what has been described above.

The foregoing drum makes it possible to produce both tires of very large diameter and proportionally low width and tires of very large diameter and of very great width, since it is possible to have a drum which has a receiving surface of small diameter in the retracted position and of very large diameter in the expanded position while, at the same time, ensuring solidity of the receiving surface so as to make it possible to accept major stresses of laying products. It is thus possible to accept tires intended to be mounted equally well on rims of a diameter of 13 inches and of a diameter of 22 inches, and to go as far as an expansion of the carcass diameter of the order of 200%.

Furthermore, it is clear that in order to produce in one and the same diameter of carcass before shaping tires of different external diameter, it is necessary to change all the plates with the exception of possible adjustment when the difference is only a few millimeters, as has been stated previously. However, since the rest of the drum and of the mechanism for displacing the plates remains identical, all that is needed here is rapid disassembly of the two screws fixing the devises 42 to the plates 31. In fact, in one and the same diameter of carcass before shaping, only the plates are dimensional, and all the rest of the drum is multidimensional.

What is claimed is:

1. A shaping drum for tire carcasses, comprising:
   a barrel having a central axis;
   two axially spaced bead-holding systems carried by the barrel for holding respective ones of the beads of a tire carcass to be shaped;
   a plurality of plates carried by the barrel, said plates being arranged circumferentially around said central axis and having radially outer surfaces defining a receiving surface for the tire carcass;
   a mechanical expansion mechanism comprising, for each plate, two arms which are articulated between a first clevics for each said plate and a first crown which is axially displaceable on the barrel, and a counter-arm articulated between one of said arms and a second crown mounted fixedly on the barrel, and permitting displacement of the plates radially between a retracted position and an expanded position of the drum by axial displacement of the first crown in combination with the locking generated by the counter-arm and the second crown;
   a second clevis integral with the radially inner side of each plate and articulated relative to the first clevis for pivotal movement of said plate about an axis parallel to said central axis; and guide means on each plate, the inner side of each plate bearing against the guide means of an adjacent plate, for positioning of the radially outer surface of each plate at the same radial distance from said central axis in the expanded position of the drum and for permitting tilting of the plates articulated thereto such that the plates are circumferentially superimposed on each other at least in part in the retracted position of the drum.

2. A shaping drum according to claim 1, wherein the guide means for each plate comprises a cam carried by the liner surface of said each plate and a guide roller for cooperating with the cam of the circumferentially adjacent plate.

3. A shaping drum according to claim 2, wherein the cam of each plate extends circumferentially and opens at each of its circumferential ends into a recess for receiving the guide roller of the guide means of the adjacent plate, the two cam recesses of each plate corresponding respectively to the expanded and retracted positions of the drum.

4. A shaping drum according to claim 3, wherein an elastic sleeve is provided around the outer circumference of said plates to ensure the contact between the cam, the cam recesses of a plate and the guide roller of the circumferentially adjacent plate.

5. A shaping drum according to claim 3, further comprising an adjustment device for permitting adjustment on the order of a few millimeters of the final diameter of expansion of the drum.

6. A shaping drum according to claim 5, wherein an elastic sleeve is provided around the outer circumference of said plates to ensure the contact between the cam, the cam recesses of a plate and the guide roller of the circumferentially adjacent plate.

7. A shaping drum according to claim 5, wherein the adjustment device comprises the guide-roller-receiving recess that corresponds to the expanded position of the drum, said recess being extended circumferentially such that its length permits different stable positioning operations of the guide roller of the adjacent plate.

8. A shaping drum according to claim 7, wherein an elastic sleeve is provided around the outer circumference of said plates to ensure the contact between the cam, the cam recesses of a plate and the guide roller of the circumferentially adjacent plate.

9. A shaping drum for tire carcasses, comprising:

a barrel having a central axis;

two axially spaced bead-holding systems carried by the barrel for holding respective ones of the beads of a tire carcass to be shaped;

a plurality of plates carried by the barrel, said plates being arranged circumferentially around said central axis and having radially outer surfaces defining a receiving surface for the tire carcass;

a clevis articulated to the radially inner side of each plate for pivotal movement of each plate about an axis parallel to said central axis;

displacement means coupled between said barrel and said clevis for displacement of said plates between a retracted position and an expanded position of the drum; and guide means on the radially inner side of each plate for coacting with the guide means of a circumferentially adjacent plate for positioning the radially outer surface of each plate at the same radial distance from said central axis in the expanded position of the drum and for permitting tilting of each plate about the pivotal axis of the clevis coupled thereto such that the plates are circumferentially superimposed at least in part in the retracted position of the drum;

wherein the displacement means comprises for each plate two arms articulated between the clevis for said each plate and a first crown which is axially displaceable on the barrel and a counter arm articulated between one of said arms and a second crown which is axially fixed relative to the barrel.

10. A shaping drum for tire carcasses, comprising:

a barrel having a central axis;

two axially spaced bead-holding systems carried by the barrel for holding respective ones of the beads of a tire carcass to be shaped;

a plurality of plates carried by the barrel, said plates being arranged circumferentially around said central axis and having radially outer surfaces defining a receiving surface for the tire carcass;

a clevis articulated to the radially inner side of each plate for pivotal movement of said each plate about an axis parallel to said central axis;

means coupled between said barrel and said clevises for displacement of said plates between a retracted position and an expanded position of the drum; and guide means on the radially inner side of each plate for coacting with the guide means of a circumferentially adjacent plate for positioning the radially outer surface of each plate at the same radial distance from said central axis in the expanded position of the drum and for permitting tilting of each plate about the pivotal axis of the clevis coupled thereto such that the plates are circumferentially superimposed at least in part in the retracted position of the drum;

wherein the guide means for each plate comprises a cam carried by the inner surface of each plate and a guide roller for cooperating with the cam of the circumferentially adjacent plate, wherein the cam of each plate extends circumferentially and opens at each of its circumferential ends into a recess for receiving the guide roller of the guide means of the adjacent plate, the two cam recesses of each plate corresponding respectively to the expanded and retracted positions of the drum.

* * * * *